Feb. 13, 1923. 1,445,251
G. F. VOIGHT
SHOCK ABSORBER
Filed Apr. 7, 1919   3 sheets-sheet 2

INVENTOR,
George F. Voight.

Feb. 13, 1923.

G. F. VOIGHT

SHOCK ABSORBER

Filed Apr. 7, 1919

INVENTOR.

George F. Voight.

Patented Feb. 13, 1923.

1,445,251

UNITED STATES PATENT OFFICE.

GEORGE F. VOIGHT, OF SAN FRANCISCO, CALIFORNIA, ASSIGNOR TO WALTER S. BURGESS, OF OAK PARK, ILLINOIS.

SHOCK ABSORBER.

Application filed April 7, 1919. Serial No. 288,162.

*To all whom it may concern:*

Be it known that I, GEORGE F. VOIGHT, a citizen of the United States, residing at San Francisco, in the county of San Francisco and State of California, have invented a new and useful Improvement in Shock Absorbers, of which the following is a specification, the accompanying drawings forming a part thereof.

My invention relates to improvements in shock absorbers for road vehicles having transverse leaf springs arranged to be in the same vertical plane as the axles of the vehicle.

An object of my invention is to provide a yielding connection between the free ends of said leaf springs and axles and whereby the leaf springs may be assisted in cushioning the body of the vehicle against the unevenness of the roads over which it may travel.

Another object of the invention is to provide improvements over the invention disclosed in my United States Patent, Number 1,267,609, granted May 28, 1918, and Number 1,294,353, granted February 11, 1919.

With the foregoing and other objects and purpose in view which will appear as the description proceeds, my invention resides in the combination and arrangement of parts and in the details of construction hereinafter described and claimed, it being understood that changes in the precise embodiment of the invention as herein disclosed can be made within the scope of what is claimed without departing from the spirit of the invention.

In the drawings—

Similar numerals of reference refer to similar parts throughout the several views.

Figure 1:
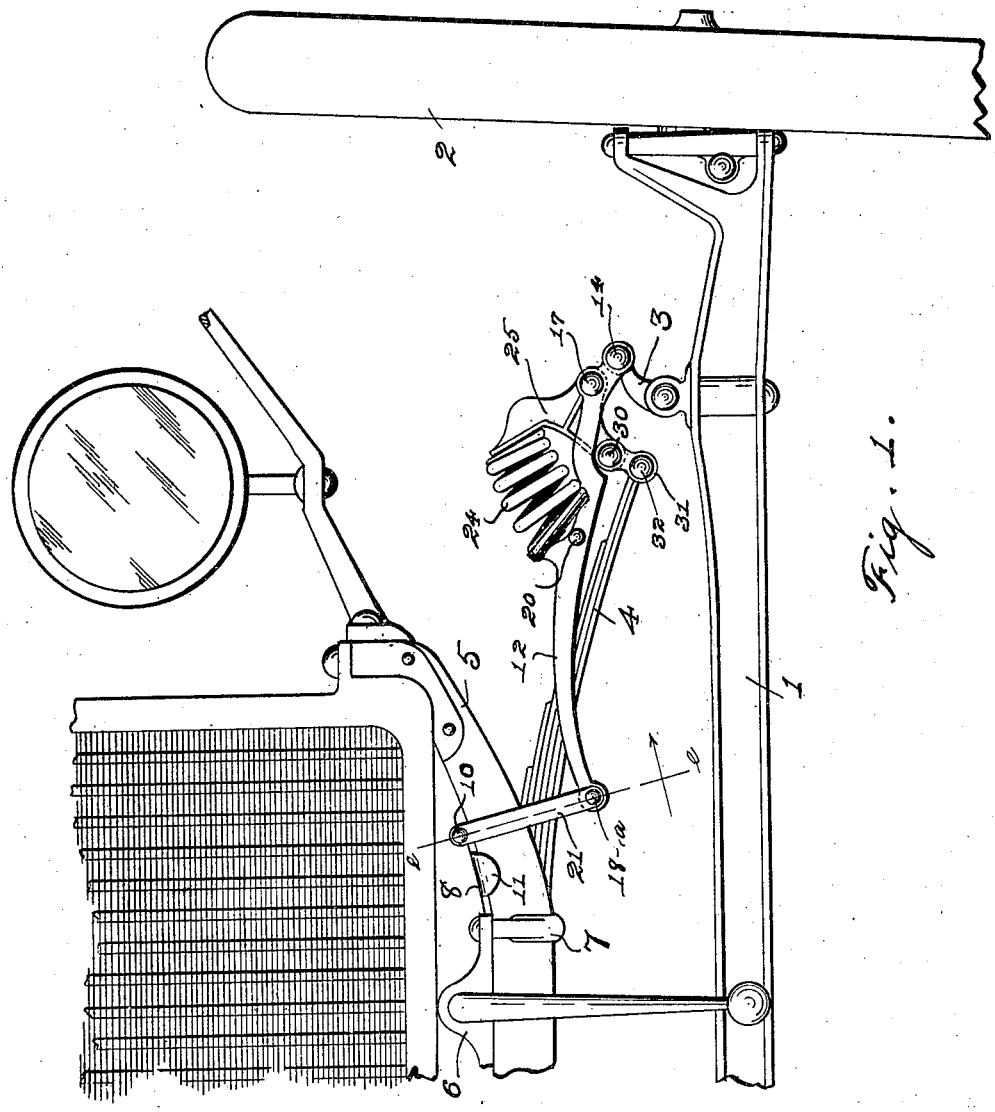
Figure 1 is a view in elevation of a portion of the left-hand side of the front end of an automobile, showing the present invention applied thereto.

1 designates the front axle of a vehicle, which is supported at one end by a wheel 2, and has rigidly secured to its upper side a bracket 3.

4 is the vehicle's front leaf spring, which supports intermediate its ends a bed plate 5 and crank bearing 6. The leaf spring 4, bed plate 5 and crank bearing 6 are rigidly clamped together by means of spring clips 7.

To facilitate in the description of the several elements and parts forming the present invention, and in defining their position relatively to the vehicle, the terms "inner end" or "inner ends" will designate the end or ends nearest the median center of the vehicle, and the terms "outer end" or "outer ends" will mean the end or ends farthest away from said center.

8 designates a saddle plate having a substantially lower flat side seated upon the upper side of the bed plate 5 intermediate the outer end of the latter and the crank bearing 6, and is provided with a horizontally extending eye or opening 9 rotatably supporting a pivot pin 10, and a pair of downwardly struck lips 11 adapted to engage the sides of the bed plate 5 for limiting its transverse movements relatively to said bed plate. The inner end of the saddle plate is intended to engage with the outer end of the crank bearing for preventing any inwardly movement of the former relatively to the latter.

Figure 2:
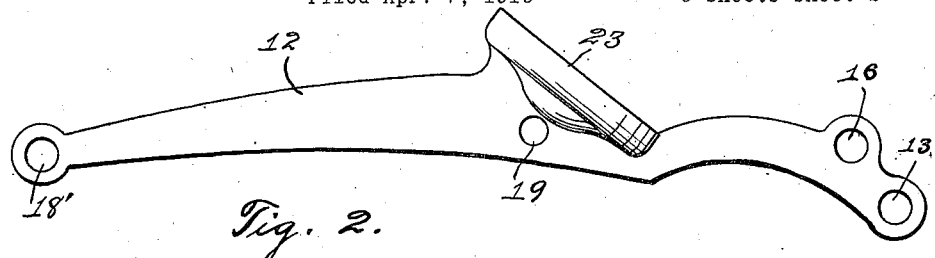
Figure 2 is a view in elevation of one of the levers forming a portion of the device.
Figure 5:
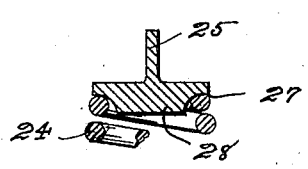
Figure 5 is a sectional view on line $b$—$b$, Fig. 3, and showing also a portion of the coil spring.
Figure 4:
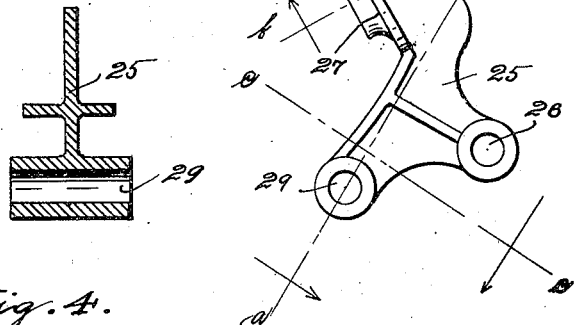
Figure 4 is a sectional view on line $a$—$a$, Fig. 3.
Figure 3:
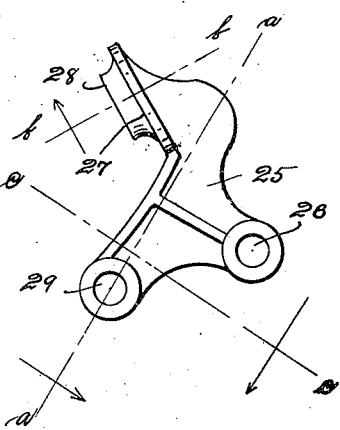
Figure 3 is a view in elevation of a portion of the device detached from the rest of it.
Figure 6:
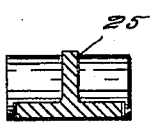
Figure 6 is a sectional view on line $c$—$c$, Fig. 3.
Figure 9:
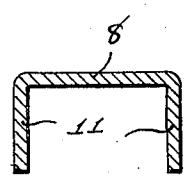
Figure 9 is a sectional view approximately on line $d$—$d$, Fig. 7.
Figure 8:
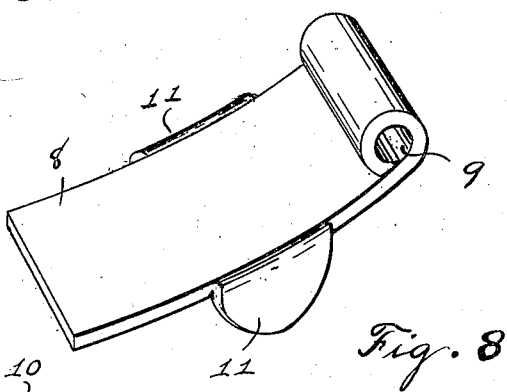
Figure 8 is a view in perspective of a portion of the invention.
Figure 7:
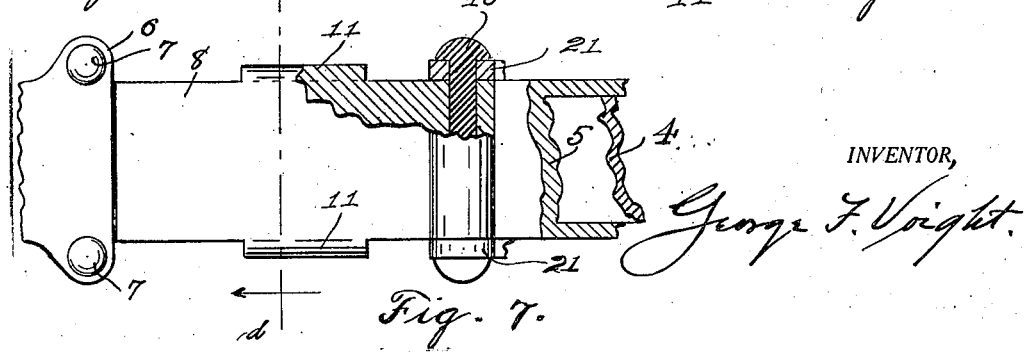
Figure 7 is a plan view of a portion of the invention and portions of the vehicle.
Figure 10:
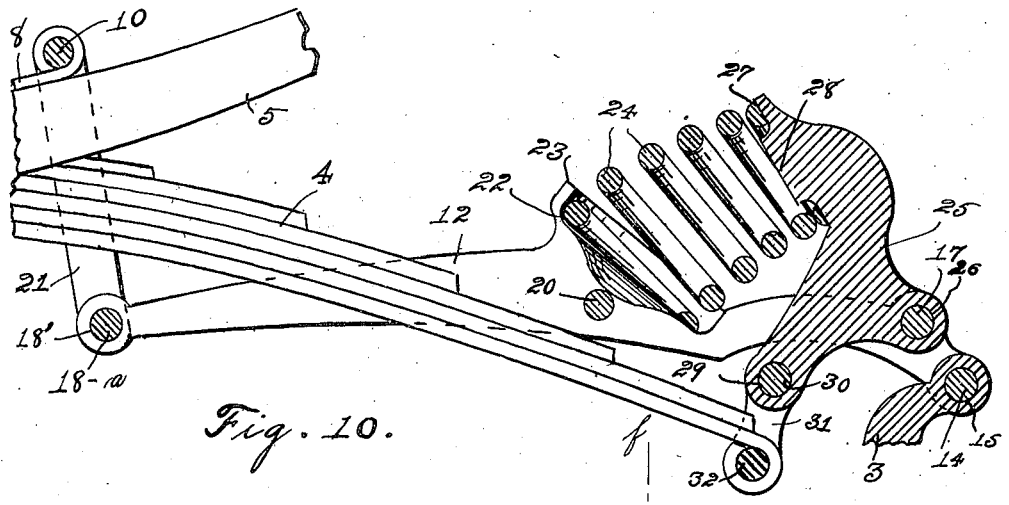
Figure 10 is a vertical section of the invention, and showing also fragments of the vehicle.

12 designates a pair of laterally-spaced apart levers disposed one on each side of the leaf spring 4 and the upper end of the bracket 3 and are provided with horizontal openings 13 (Figure 2) supporting the ends of a pivot pin 14 journaled in an opening 15 extending through the upper end of said bracket 3; openings 16 of said levers supporting the ends of a pivot pin 17; openings 18' supporting a pin 18ᵃ, and openings 19 rigidly supporting a pin 20 adapted to hold the levers intermediate their ends a definite distance apart.

To the outer ends of the pin 10 are secured the upper ends of a pair of oscillatory links 21 disposed one on each side of the bed plate 5 and leaf spring 4 and free to move relatively thereto. The lower ends of the links support the pin 18ᵃ, the connection therewith being such that the links may rotate about the axis of said pin relatively to the levers 12.

Figure 11:
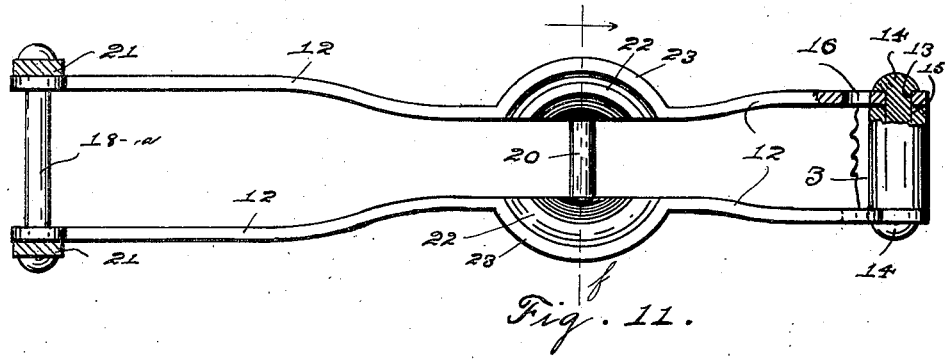
Figure 11 is a plan view of portions of the device.
Figure 12:
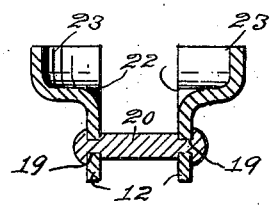
Figure 12 is a view on line $f$—$f$, Fig. 11.
Figure 13:
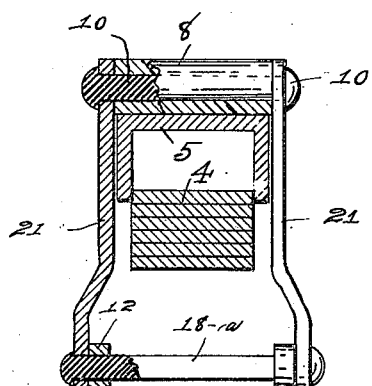
Figure 13 is a view approximately in line $e$—$e$, Fig. 1.

22 represents a pair of oppositely arranged arc-shaped lips disposed one on each of the levers 12 (Figure 11) and said lips are provided with marginal flanges 23, said lips and flanges forming a spring seat for the lower end of a spiral compression spring 24.

25 represents a spring hanger disposed between the levers 12 intermediate their outer ends and said spring seat, and has a section provided with a horizontally extending opening 26 through which extends the pin 17, by which it pivotally supports the hanger. An upper section of said hanger extends above the levers and has a faced portion 27 seated upon the upper end of the compression spring 24, and a lug 28 projects centrally from said faced portion and extends into the opening of the upper end of the spring 24 and secures said spring between hanger 25 and the lower spring seat 22, 23.

29 is an opening extending horizontally through a section of said hanger disposed below the levers 12 and supports the upper pin 30 of a spring shackle 31, the lower pin 32 of the shackle supporting one end of the leaf spring 4.

By reason of the pivoted connection of the hanger directly to the lever closely adjacent to the pivot point of the latter with the perch or bracket 3, at which point the lever moves down slowly, the action of the main spring, through the hanger, on the auxiliary spring 24 is active and prompt, thereby bringing the auxiliary spring quickly into action to take the first minor vibrations, and this is especially true when the outer end of said hanger swings downwardly in a substantially axial direction to the auxiliary spring, as when the axis of said spring is outwardly and upwardly inclined, whereby there is little or no side thrust on said auxiliary spring, tending to dampen its action. The said hanger being pivoted to the same element on which the spring seat 22, 23 is formed tends to hold the outer end of said hanger in proper compressing relation to said auxiliary spring.

I claim:—

1. In combination, a lever adapted at its outer end for pivotal support to a fixed bracket and adapted at its inner end to a movable support, and provided between its ends with a spring seat, a spring hanger adapted, between its ends, for connection to a main spring, and pivoted at its outer end to said lever between the pivotal end of the lever and its spring seat, and provided inwardly beyond its pivot with a spring seat opposed to the spring seat of said lever, and a compression spring between said seats.

2. In combination, a lever adapted at its outer end for pivotal support to a fixed bracket and adapted at its inner end to a movable support, and provided between its ends with a spring seat, a spring hanger adapted between its ends for connection to an end of a main spring, and pivoted at its outer end to said lever inwardly beyond the pivotal end of the lever and provided inwardly beyond its pivot with a spring seat opposed to the spring seat of said lever, and a compression spring between said seats.

3. In combination, a lever adapted at its outer end for pivotal support to a fixed bracket, and adapted at its inner end to a movable support, and provided between its ends with an oblique spring seat which faces outwardly and upwardly, a spring hanger adapted between its ends for connection to a main spring and pivoted to said lever inwardly beyond the pivotal end of the lever and provided inwardly beyond its pivot with an oblique inwardly- and downwardly facing spring seat opposed to the spring seat of the lever, and an obliquely disposed coiled spring interposed between said seats.

GEORGE F. VOIGHT.